(12) United States Patent
Rosenberg et al.

(10) Patent No.: US 11,924,354 B2
(45) Date of Patent: Mar. 5, 2024

(54) DATA CENTER RECOVERY POD SYSTEMS AND METHODS

(71) Applicant: JPMORGAN CHASE BANK, N.A., New York, NY (US)

(72) Inventors: Nick Rosenberg, Flower Mound, TX (US); Jonathan Elvers, St. Albans (GB); Antonio G. Jarufe, Holmdel, NJ (US); Scott D. Valentine, Carneys Point, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 356 days.

(21) Appl. No.: 17/206,576

(22) Filed: Mar. 19, 2021

(65) Prior Publication Data

US 2022/0303142 A1   Sep. 22, 2022

(51) Int. Cl.
*H04L 9/32*  (2006.01)
*G06F 11/14*  (2006.01)
*G06F 16/23*  (2019.01)
*G06F 16/27*  (2019.01)

(52) U.S. Cl.
CPC ........ *H04L 9/3247* (2013.01); *G06F 11/1469* (2013.01); *G06F 16/2365* (2019.01); *G06F 16/278* (2019.01)

(58) Field of Classification Search
CPC ............. G06F 11/1469; G06F 16/2365; G06F 16/278; G06F 16/119; G06F 16/164; G06F 16/178; G06F 16/182; G06F 16/188; G06F 16/2343; G06F 16/951; H04L 9/3247

USPC ................................ 711/161, 154; 707/602
See application file for complete search history.

(56) References Cited

U.S. PATENT DOCUMENTS

| | | | |
|---|---|---|---|
| 6,044,444 A * | 3/2000 | Ofek | G06F 11/2082 |
| | | | 714/763 |
| 6,356,941 B1 * | 3/2002 | Cohen | H04L 63/10 |
| | | | 713/168 |
| 6,785,786 B1 * | 8/2004 | Gold | G06F 11/1469 |
| | | | 714/E11.122 |

(Continued)

OTHER PUBLICATIONS

Zach Lontz et al. "Network Air Locks, not Air Gaps, to Preserve LAN Security"; The Colloquium for Information System Security Education (CISSE); Jun. 2019 (Year: 2019).*

*Primary Examiner* — Dennis Truong
(74) *Attorney, Agent, or Firm* — GREENBERG TRAURIG LLP

(57) ABSTRACT

A method for ingesting data artifacts into a recovery pod may include: identifying, by a first controller, a data artifact for ingestion; pulling, by the first controller, the data artifacts into the first datastore; confirming, by second controller, that a first airlock between the first zone and the second zone and a second airlock between a third zone and the second zone are closed; opening, by the second controller, the first airlock; identifying, by the second controller, the data artifacts in the first datastore; pulling, by the second controller, the data artifacts into a second datastore; confirming that the first airlock and the second airlock are closed; opening, by the second controller, the second airlock; identifying, by a third controller, the data artifacts in the second zone datastore; pulling, by the third controller, the data artifacts into a third zone datastore; and closing, by the second controller, the second airlock.

20 Claims, 4 Drawing Sheets

(56) References Cited

U.S. PATENT DOCUMENTS

| | | | | |
|---|---|---|---|---|
| 6,965,893 B1* | 11/2005 | Chan | G06F 16/2343 | 710/200 |
| 7,149,858 B1* | 12/2006 | Kiselev | H04L 67/565 | 711/163 |
| 7,587,558 B1* | 9/2009 | Smith | G06F 12/14 | 711/152 |
| 7,647,443 B1* | 1/2010 | Chatterjee | G06F 3/067 | 710/200 |
| 8,131,681 B1* | 3/2012 | Hangud | G06F 11/1469 | 707/654 |
| 8,271,468 B1* | 9/2012 | Peddy | G06Q 30/02 | 707/711 |
| 9,424,140 B1* | 8/2016 | Madhavarapu | G06F 11/0751 | |
| 10,558,581 B1* | 2/2020 | Lazier | G06F 21/6218 | |
| 11,086,553 B1* | 8/2021 | Fisher | G06F 3/0685 | |
| 2007/0088928 A1* | 4/2007 | Thangaraj | G06F 3/0689 | 711/163 |
| 2008/0071997 A1* | 3/2008 | Loaiza | G06F 9/526 | 710/200 |
| 2011/0047627 A1* | 2/2011 | Sheymov | H04L 63/1425 | 726/26 |
| 2012/0017059 A1* | 1/2012 | Gold | G06F 11/1453 | 711/E12.103 |
| 2014/0068185 A1* | 3/2014 | Lehr | G06F 3/0649 | 711/117 |
| 2014/0351375 A1* | 11/2014 | Flowers | G06F 16/27 | 709/217 |
| 2016/0205075 A1* | 7/2016 | Asokan | G06F 21/606 | 713/168 |
| 2016/0376103 A1* | 12/2016 | De Angelis | B65G 1/065 | 414/284 |
| 2017/0192863 A1* | 7/2017 | Eluri | G06F 16/27 | |
| 2018/0157752 A1* | 6/2018 | Arikatla | G06F 16/951 | |
| 2018/0165134 A1* | 6/2018 | Liu | G06F 9/526 | |
| 2019/0080319 A1* | 3/2019 | Carey | G06Q 20/3674 | |
| 2019/0109831 A1* | 4/2019 | Agarwal | H04L 63/20 | |
| 2020/0042534 A1* | 2/2020 | Shmueli | G06F 16/2365 | |
| 2020/0320215 A1* | 10/2020 | Bhosale | G06F 11/1461 | |
| 2021/0211407 A1* | 7/2021 | Ochs-Willard | H04L 63/0209 | |
| 2021/0226929 A1* | 7/2021 | Kiyanclar | H04L 63/20 | |
| 2022/0019694 A1* | 1/2022 | Nelluri | G06F 21/6245 | |
| 2022/0114062 A1* | 4/2022 | Madan | G06F 11/2094 | |

* cited by examiner

DATA CENTER RECOVERY POD SYSTEMS AND METHODS

FIELD OF THE INVENTION

The present disclosure generally relates to data center recovery pod systems and methods.

DESCRIPTION OF THE RELATED ART

Data centers process a significant amount of information. Some of the data that is stored is system data that is necessary to restore system operations. The system data must be stored in such a manner that it can be recovered. If any corrupt data is commingled with the system data, there is a possibility that the system data will be corrupted, thereby preventing restoration.

SUMMARY OF THE INVENTION

Systems and methods for providing a recovery pod are disclosed. In one embodiment, in an information processing apparatus comprising at least one compute processor, a method for ingesting data artifacts into a multi-zone recovery pod may include: (1) identifying, by a first controller for a first zone in the multi-zone recovery pod, a data artifact for ingestion into a first zone datastore; (2) pulling, by the first controller, the identified data artifacts into the first zone datastore; (3) confirming, by second controller for a second zone in the multi-zone recovery pod, that a first airlock between the first zone and the second zone is closed, and that a second airlock between a third zone of the multi-zone recovery pod and the second zone is closed; (4) opening, by the second controller, the first airlock; (5) identifying, by the second controller, the data artifacts in the first zone datastore; (6) pulling, by the second controller, the identified data artifacts in the first zone datastore into a second zone datastore; (7) closing, by the second controller, the first airlock and confirming that the first airlock and the second airlock are closed; (8) opening, by the second controller, the second airlock; (9) identifying, by a third controller for the third zone, the data artifacts in the second zone datastore; (10) pulling, by the third controller, the identified data artifacts in the second zone datastore into a third zone datastore; and (11) closing, by the second controller, the second airlock.

In one embodiment, the method may further include executing, by the first controller, a security scan on the data artifacts in the first zone datastore.

In one embodiment, the method may further include signing, by the first controller, the data artifacts in the first zone datastore.

In one embodiment, the method may further include executing, by the second controller, a security scan on the data artifacts in the second zone datastore.

In one embodiment, the method may further include signing, by the second controller, the data artifacts in the second zone datastore.

In one embodiment, the method may further include executing, the third controller, a security scan on the data artifacts in the third zone datastore.

In one embodiment, the method may further include verifying, by the third controller, at least one signature on the data artifacts in the third zone datastore.

In one embodiment, the data artifacts may include system data such as operating system data, configuration data, service-level application binaries, etc.

In one embodiment, the method may further include receiving, by the third controller, an identification of a common data restoration access point; identifying, by the third controller, at least one stored data artifact in the third zone datastore that meet the common data restoration access point; and pushing, by the third controller, the identified stored data artifact to an object store over a physical interconnect.

According to another embodiment, a multi-zone recovery pod may include a first zone comprising a first controller and a first zone datastore; a second zone comprising a second controller and a second zone datastore; a first airlock between the second zone and the first zone, wherein the first airlock is configured to be controlled by the second controller; a third zone comprising a third controller and a third zone datastore; and a second airlock between the third zone and the second zone, wherein the second airlock is configured to be controlled by the second controller. The first controller may be configured to: identify a data artifact for ingestion into the first zone datastore; and pull the identified data artifacts into the first zone datastore. The second controller may be configured to: confirm that the first airlock and the second airlock are closed; open the first airlock; identify the data artifacts in the first zone datastore; pull the identified data artifacts in the first zone datastore into the second zone datastore; close the first airlock; confirm that the first airlock and the second airlock are closed; and open the second airlock. The third controller may be configured to: identify the data artifacts in the second zone datastore; and pull the identified data artifacts in the second zone datastore into the third zone datastore. The second controller closes the second airlock after the third controller pulls the identified data artifacts into the third zone datastore.

In one embodiment, the first controller may be further configured to execute a security scan on the data artifacts in the first zone datastore.

In one embodiment, the first controller may be further configured to sign the data artifacts in the first zone datastore.

In one embodiment, the second controller may be further configured to execute a security scan on the data artifacts in the second zone datastore.

In one embodiment, the first controller may be further configured to sign the data artifacts in the second zone datastore.

In one embodiment, the third controller may be further configured to execute a security scan on the data artifacts in the third zone datastore.

In one embodiment, the first controller may be further configured to verify at least one signature on the data artifacts in the third zone datastore.

In one embodiment, the data artifacts may include system data such as operating system data, configuration data, service-level application binaries, etc.

In one embodiment, the third controller may be further configured to: receive an identification of a common data restoration access point; identify at least one stored data artifact in the third zone datastore that meet the common data restoration access point; and push the identified stored data artifact to an object store over a physical interconnect.

BRIEF DESCRIPTION OF THE DRAWINGS

In order to facilitate a fuller understanding of the present invention, reference is now made to the attached drawings.

The drawings should not be construed as limiting the present invention but are intended only to illustrate different aspects and embodiments.

DETAILED DESCRIPTION OF PREFERRED EMBODIMENTS

Embodiments are generally directed to data center recovery pod systems and methods. In embodiments, a recovery pod may be isolated via multiple airlocks and may store system data necessary to rebuild a system.

In embodiments, all data that is consumed is pulled from outside the system or from another zone; data is not pushed.

Figure 1:
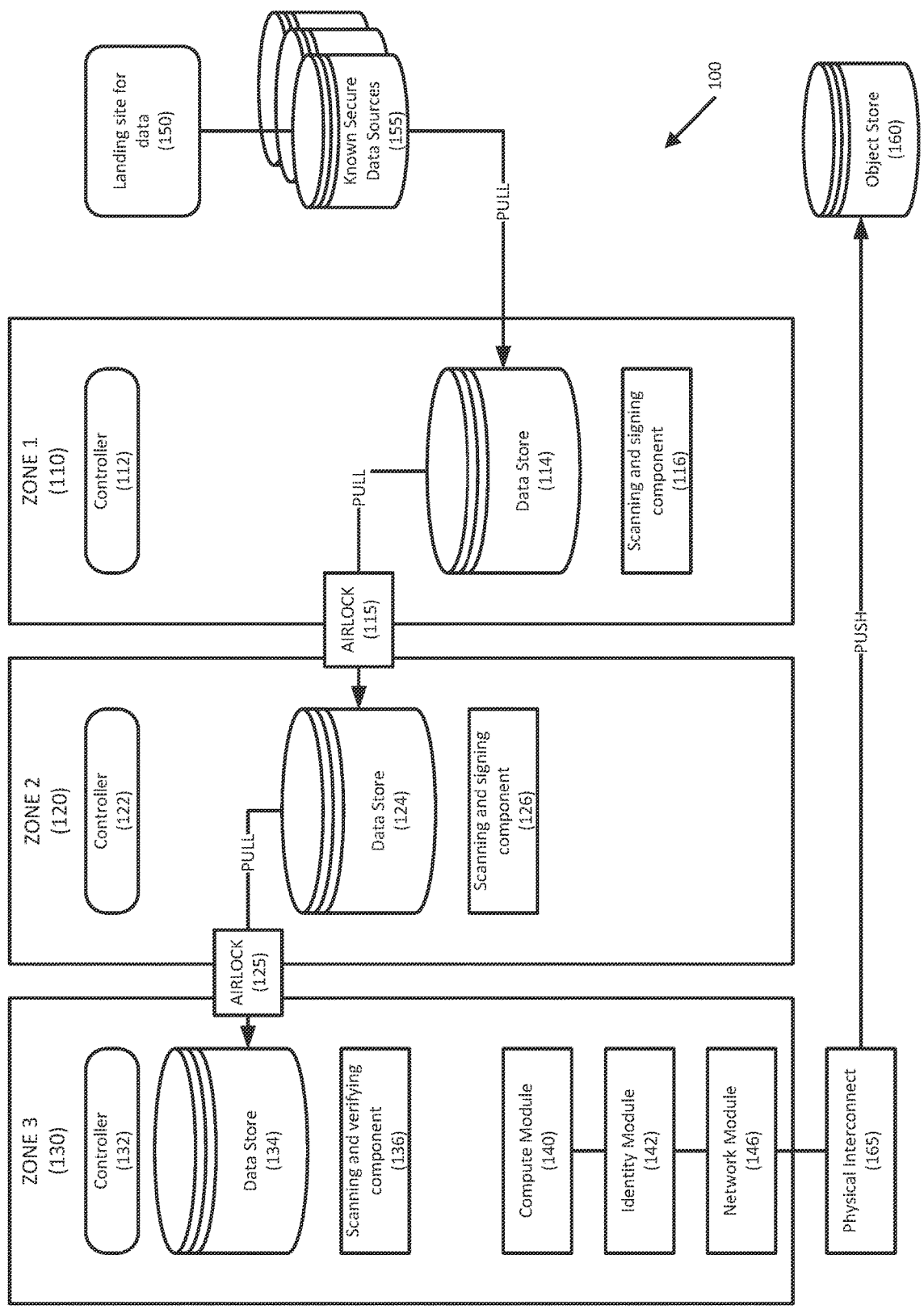
FIG. 1 depicts a data center recovery pod system according to one embodiment.

Referring to FIG. 1, a system for providing a data center recovery pod is disclosed. System 100 may include a plurality of data zones, such as zones 110, 120, and 130. Additional zones may be provided as is necessary and/or desired. In FIG. 1, zone 110 is the least secure zone, while zone 130 is the most secure.

Data may be communicated between zone 110 and zone 120 via airlock 115, and between zone 120 and zone 130 via airlock 125. In embodiments, airlocks 115 and 125 may not be opened at the same time, and may be opened for a short duration.

Controller 122 may control airlocks 115 and 125. In one embodiment, controller 122 may hold all credentials to manage airlocks 115 and 125. Before opening airlock 115 or airlock 125, controller 122 may validate the both airlocks 115 and 125 are closed, thereby preventing both from being open at the same time.

Controller 112 may identify new artifacts in, for example, known secure data sources 155, to temporarily store and may pull the artifacts into local datastore 114. In one embodiment, artifacts may be received at landing site 150, and may then be ingested into known secure data sources 155. Artifacts may include metadata and system data necessary to restore a system. Examples may include operating system data, configuration data to personalize and/or customize services, service-level application binaries and their unique configurations needed to recreate the services, etc.

In embodiments, controller 112 may periodically check for new or updated artifacts, may check on demand, or may check as is otherwise necessary and/or desired.

Ingested data in datastore 114 may undergo a preliminary security scan process. In one embodiment, once the preliminary security scan is complete, the data may be signed. For example, standard virus and vulnerability scans may be performed, along with standard checksum processes and digital signature processes may be performed.

In one embodiment, scanning and signing component 116 may conduct the preliminary scan and may sign the ingested data in datastore 114.

Controller 122 may check for new or updated artifacts in datastore 114 by opening airlock 115 and examining datastore 114. In one embodiment, before opening airlock 115, controller 122 may verify that airlocks 115 and 125 are closed. If a new or updated data artifact is identified, controller 122 may consume the data artifact into datastore 124 and may write this to a log stored in datastore 114. The log may keep track of added or otherwise changed data artifacts and their movement between zones, may check the status of movement (e.g. a "working" status indicates that airlock 115 should remain open, while a "done" status indicates that airlock 115 may be closed), etc. Controller 122 may then close airlock 115.

In embodiments, controller 122 may periodically check for new or updated data artifacts, may check on demand, or may check as is otherwise necessary and/or desired.

Data artifacts in datastore 124 may undergo a second security scan process. In one embodiment, once the second security scan is complete, the data artifacts may be signed.

In one embodiment, scanning and signing component 126 may conduct the preliminary scan and may sign the ingested data in datastore 124. In one embodiment, the scanning may be similar to the scanning performed by scanning and signing component 116.

In one embodiment, controller 122 may open airlock 125 so controller 132 can check datastore 124 for new or updated data artifacts. In one embodiment, before opening airlock 125, controller 122 may verify that airlocks 115 and 125 are closed. Once controller 132 detects airlock 115 being in the open state, it may set a working state in a log for datastore 124 and may check for new or updated data artifacts.

If a new or updated data artifact is identified, controller 132 may consume the data artifact into datastore 134 and may write this to a log stored in datastore 124. The log may be used to keep track of added or otherwise changed data artifacts and their movement between zones. Controller 122 may then close airlock 125.

In embodiments, controller 132 may periodically check for new or updated data artifacts, may check on demand, or may check as is otherwise necessary and/or desired.

Data artifacts in datastore 134 may undergo a third security scan process. In one embodiment, scanning and signing component 136 may conduct the preliminary scan and may validate the signatures on the ingested data in datastore 134.

Controllers 112, 122, 132 may be fully autonomous, and may be configured using a configuration file. In one embodiment, a single controller may provide the functionality of controllers 112, 122, 132.

System 100 may further include object store 160, which may receive data artifacts from datastore 134 in a recovery event. Object store 160 may interface with zone 3 130 via physical interconnect 165.

In one embodiment, zone 3 130 may further include compute module 140, identity module 142, and network module 144. Depending on the type of recovery, one or more of modules 140, 142, 144 may be instantiated as is necessary and/or desired. Compute module 140 may execute additional virtualized software processes based on recovery needs. Identify module 142 may create local zone authentication and authorization process to support inter-process security in the zone. Network 144 module may provide interconnectivity for compute module 142 and identity module 142. Network module may provide a physical connectivity to object store 160 and/or network locations in order to perform recovery.

Collectively, zones 110, 120, and 130, along with controllers 112, 122, and 132, datastores 114, 124, 134, airlocks 115 and 125, along with other hardware, may be referred to as a "recovery pod."

Figure 2A:
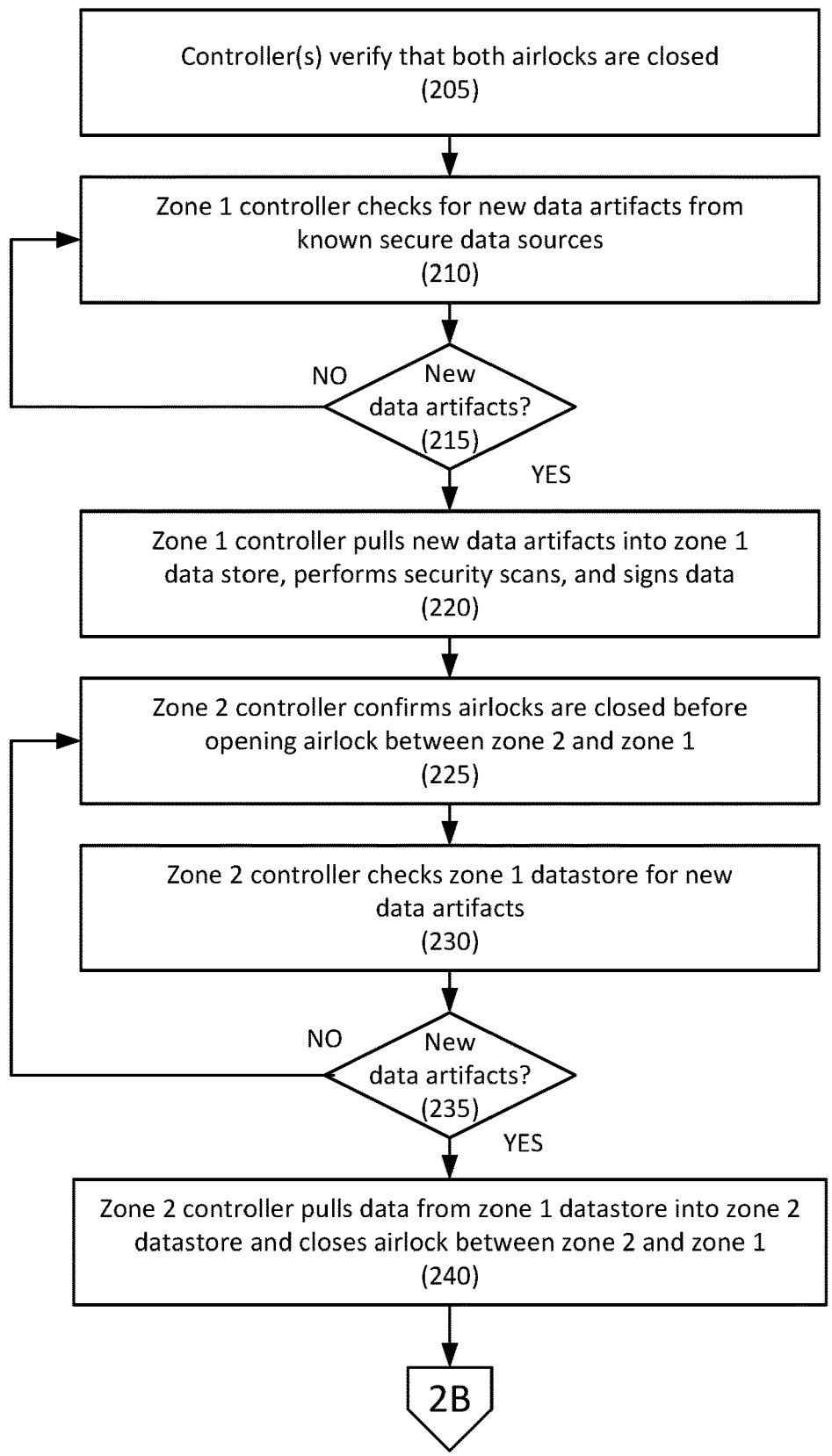
FIGS. 2A and 2B depicts a method for ingesting data into a data center recovery pod according to one embodiment.
Figure 2B:
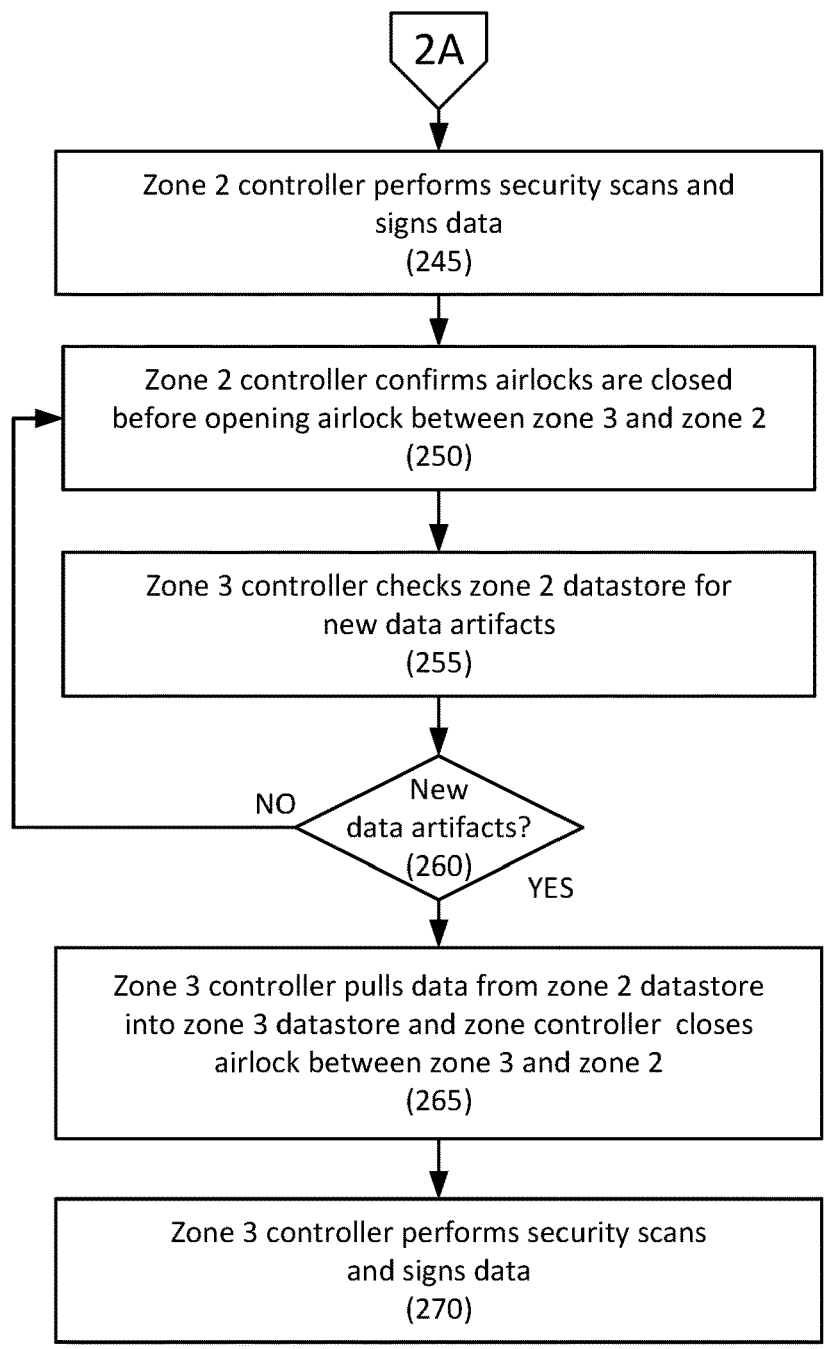

Referring to FIGS. 2A and 2B, a method for ingesting data into a data center recovery pod is provided according to an embodiment.

In step 205, airlocks between zone 1 and zone 2, and zone 2 and zone 3 of a recovery pod may be closed. This may be the default configuration for the recovery pod.

In one embodiment, if the recovery pod includes additional zones and/or additional airlocks, those airlocks may also be closed.

In step 210, a controller for zone 1, such as a zone 1 controller, may check for new data artifacts to ingest from known secure data sources. In one embodiment, the zone 1 controller may check for new data artifacts periodically, on-demand, as otherwise necessary and/or desired.

In one embodiment, the data artifacts may include, for example, system data necessary to restore a system. Examples may include operating system data, configuration data to personalize and/or customize services, service-level application binaries and their unique configurations needed to recreate the services, etc.

In step 215, if there are new data artifacts, in step 220, the zone 1 controller may pull the data artifacts from the known secure data sources. The zone 1 controller may further perform a security scan on the ingested data artifacts and may sign the ingested data artifacts.

For example, standard virus and vulnerability scans may be performed, along with standard checksum processes and digital signature processes may be performed.

In step 225, a controller for a second zone, such as a zone 2 controller, may confirm that both airlocks are closed before, in step 230, opening the airlock between zone 2 and zone 1. In step 235, the zone 2 controller may check to see if there are new data artifacts ingested into zone 1 datastore. In one embodiment, the zone 2 controller may check for new data artifacts periodically, on-demand, as otherwise necessary and/or desired.

If there are new data artifacts, in step 240, the zone 2 controller may pull the new data artifacts from the zone 1 datastore into zone 2. The controller for zone 2 may then close the airlock between zone 2 and zone 1.

In step 245, the zone 2 controller may further perform a security scan on the ingested data and may sign the ingested data. In one embodiment, the same or different scans performed in step 220 may be performed.

In step 250, the zone 2 controller may confirm that both airlocks are closed before opening the airlock between zone 3 and zone 2. In step 255, a controller for zone 3, such as the zone 3 controller, may check to see if there are new data artifacts ingested into zone 2 datastore. In one embodiment, the zone 3 controller may check for new data artifacts periodically, on-demand, as otherwise necessary and/or desired.

If, in step 260, there are new data artifacts, in step 265, the zone 3 controller may pull the new data artifacts from the zone 2 datastore into zone 3. The controller for zone 2 may then close the airlock between zone 3 and zone 2.

In step 270, the zone 3 controller may further perform a security scan on the ingested data and may validate the signatures on the data artifacts (i.e., the signatures of the zone 1 controller and the zone 2 controller) to ensure that the data artifacts have not been tampered through the ingest process.

Figure 3:
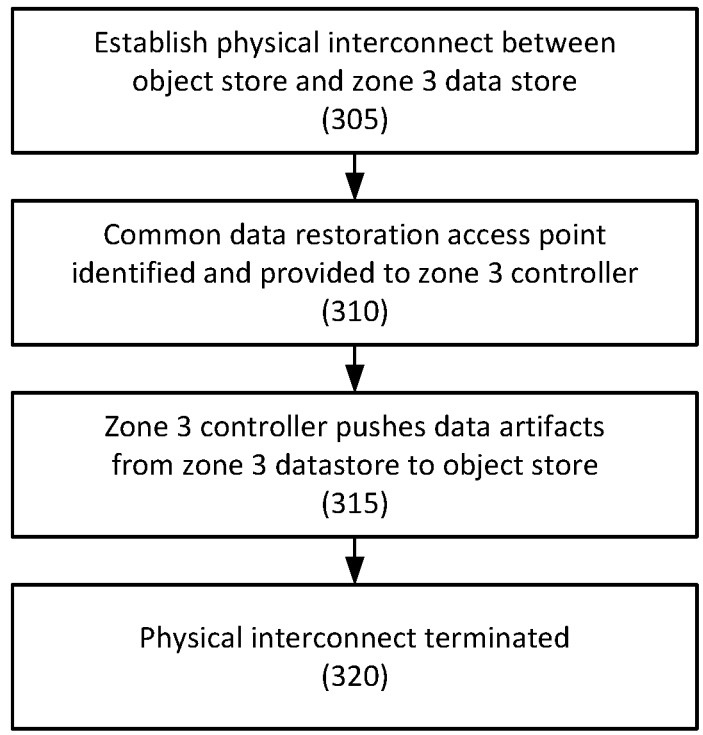
FIG. 3 depicts a method for data artifact restoration is provided according to an embodiment.

Referring to FIG. 3, a method for data artifact restoration is provided according to an embodiment.

In step 305, a physical interconnect between an object store that will receive the recovery data and the zone 3 datastore may be established. The physical interconnect may allow one-way communication from the zone 3 datastore to the object store.

In one embodiment, the credentials that are used inside of zones 1, 2, and 3 are unique and not trusted or otherwise known outside of the zones. Thus, this provides a first layer of protection from any external access to any of the zones while it is physically connected to another network. In one embodiment, the address of location of the zones may be provisioned "just in time."

In one embodiment, due to the continuous integrity checks (e.g., virus scans and signature validation), if an unknown data artifact is discovered in the POD, it can be removed.

In step 310, the zone 3 controller may receive an identification of a common data restoration access point. This may be received from, for example, an external system. In one embodiment, the restoration process may be human gated or initiated.

In step 315, using the common data restoration access point, the zone 3 controller may identify the data artifacts and may push the data artifacts to the object store over the physical interconnect. In one embodiment, during recovery mode, a hard lock may be put on all other processes. For example, the zone 1 controller and the zone 2 controller may be disabled and the first and second airlocks may be locked.

In step 320, the physical interconnect may be terminated.

It should be recognized that although several different embodiments are disclosed, these embodiments are not exclusive. Thus, although certain features may be disclosed in the context of one embodiment, the features may be used any embodiment as is necessary and/or desired.

Hereinafter, general aspects of implementation of the systems and methods of the embodiments will be described.

The system of the embodiments or portions of the system of the embodiments may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A method for ingesting data artifacts into a multi-zone recovery pod, comprising:
    identifying, by a first controller for a first data zone in the multi-zone recovery pod, a data artifact for ingestion into a first data zone datastore;
    pulling, by the first controller, the identified data artifacts into the first data zone datastore;
    confirming, by a second controller for a second data zone in the multi-zone recovery pod, that a first airlock between the first data zone and the second data zone is closed, and that a second airlock between a third data zone of the multi-zone recovery pod and the second data zone is closed;
    opening, by the second controller, the first airlock thereby allowing data to be communicated between the first data zone and the second data zone;
    identifying, by the second controller, the data artifacts in the first data zone datastore;
    pulling, by the second controller, the identified data artifacts in the first data zone datastore into a second data zone datastore through the first airlock;
    closing, by the second controller, the first airlock thereby preventing data from being communicated between the first data zone and the second data zone and confirming that the first airlock and the second airlock are closed;
    opening, by the second controller, the second airlock thereby allowing data to be communicated between the second data zone and the third data zone;
    identifying, by a third controller for the third data zone, the data artifacts in the second data zone datastore;
    pulling, by the third controller, the identified data artifacts in the second data zone datastore into a third data zone datastore through the second airlock; and
    closing, by the second controller, the second airlock thereby preventing data from being communicated between the second data zone and the third data zone;
    wherein the first data zone is a least secure data zone in the multi-zone recovery pod, and the third data zone is a most secure data zone in the multi-zone recovery pod.

2. The method of claim 1, further comprising:
    executing, by the first controller, a security scan on the data artifacts in the first data zone datastore.

3. The method of claim 2, further comprising:
    signing, by the first controller, the data artifacts in the first data zone datastore.

4. The method of claim 1, further comprising:
    executing, by the second controller, a security scan on the data artifacts in the second data zone datastore.

5. The method of claim 4, further comprising:
    signing, by the second controller, the data artifacts in the second data zone datastore.

6. The method of claim 1, further comprising:
    executing, the third controller, a security scan on the data artifacts in the third data zone datastore.

7. The method of claim 6, further comprising:
    verifying, by the third controller, at least one signature on the data artifacts in the third data zone datastore.

8. The method of claim 1, wherein the data artifacts comprise system data.

9. The method of claim 8, wherein the system data comprises one or more of operating system data, configuration data, and service-level application binaries.

10. The method of claim 1, further comprising:
    receiving, by the third controller, an identification of a common data restoration access point;
    identifying, by the third controller, at least one stored data artifact in the third data zone datastore that meet the common data restoration access point; and
    pushing, by the third controller, the identified stored data artifact to an object store over a physical interconnect.

11. A system, comprising:
    a first data zone in a multi-zone recovery pod comprising a first controller executed by a first computer processor and a first data zone datastore;
    a second data zone in the multi-zone recovery pod comprising a second controller executed by a second computer processor and a second data zone datastore;
    a first airlock between the second data zone and the first data zone, wherein the first airlock is configured to be controlled by the second controller;
    a third data zone in the multi-zone recovery pod comprising a third controller executed by a third computer processor and a third data zone datastore, wherein the first data zone is a least secure data zone in the multi-zone recovery pod, and the third data zone is a most secure data zone in the multi-zone recovery pod; and a second airlock between the third data zone and the second data zone, wherein the second airlock is configured to be controlled by the second controller;

wherein the first controller is configured to:
  identify a data artifact for ingestion into the first data zone datastore; and
  pull the identified data artifacts into the first data zone datastore;

wherein the second controller is configured to:
  confirm that the first airlock and the second airlock are closed;
  open the first airlock, thereby allowing data to be communicated between the first data zone and the second data zone;
  identify the data artifacts in the first data zone datastore;
  pull the identified data artifacts in the first data zone datastore into the second data zone datastore;
  close the first airlock, thereby preventing data from being communicated between the first data zone and the second data zone;
  confirm that the first airlock and the second airlock are closed; and
  open the second airlock, thereby allowing data to be communicated between the second data zone and the third data zone;

wherein the third controller is configured to:
  identify the data artifacts in the second data zone datastore; and
  pull the identified data artifacts in the second data zone datastore into the third data zone datastore;

wherein the second controller closes the second airlock after the third controller pulls the identified data artifacts into the third data zone datastore, thereby preventing data from being communicated between the second data zone and the third data zone.

12. The system of claim 11, wherein the first controller is further configured to execute a security scan on the data artifacts in the first data zone datastore.

13. The system of claim 12, wherein the first controller is further configured to sign the data artifacts in the first data zone datastore.

14. The system of claim 11, wherein the second controller is further configured to execute a security scan on the data artifacts in the second data zone datastore.

15. The system of claim 14, wherein the first controller is further configured to sign the data artifacts in the second data zone datastore.

16. The system of claim 11, wherein the third controller is further configured to execute a security scan on the data artifacts in the third data zone datastore.

17. The system of claim 16, wherein the first controller is further configured to verify at least one signature on the data artifacts in the third data zone datastore.

18. The system of claim 11, wherein the data artifacts comprise system data.

19. The system of claim 18, wherein the system data comprises one or more of operating system data, configuration data, and service-level application binaries.

20. The system of claim 11, wherein the third controller is further configured to:
  receive an identification of a common data restoration access point;
  identify at least one stored data artifact in the third data zone datastore that meet the common data restoration access point; and
  push the identified stored data artifact to an object store over a physical interconnect.

* * * * *